C. H. VICTORY.

Assignor to W. F. ROCKEFELLER.

Bale-Tie.

No. 8,314. Reissued July 2, 1878.

Witnesses;

Wm F. Rockefeller

Wm H. Sons

Inventor;

Charles H. Victory

N. PETERS, PHOTO-LITHOGRAPHER, WASHINGTON, D. C.

UNITED STATES PATENT OFFICE.

CHARLES H. VICTORY, OF ALBANY, NEW YORK, ASSIGNOR TO WILLIAM F. ROCKEFELLER, OF SAME PLACE.

IMPROVEMENT IN BALE-TIES.

Specification forming part of Letters Patent No. 184,739, dated November 28, 1876; Reissue No. 8,314, dated July 2, 1878; application filed April 22, 1878.

*To all whom it may concern:*

Be it known that I, CHARLES H. VICTORY, of the city and county of Albany and State of New York, have invented a new and useful Improvement in Bale-Ties; and I do hereby declare that the following is a full, clear, and exact description of the same, reference being had to the accompanying drawings and the the letters of reference marked thereon, forming a part of this specification, and in which—

Figure 1:
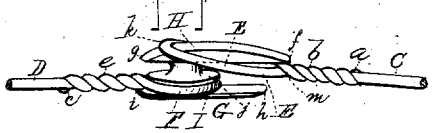
Figure 2:
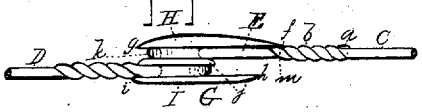
Figure 3:
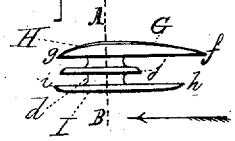
Figure 6:
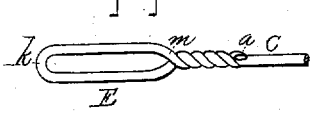
Figure 4:
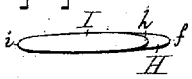
Figure 5:
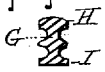

Figure 1 represents a perspective view of so much of a bale-tie as is necessary to illustrate my invention. Fig. 2 represents a side view of the parts shown in Fig. 1 as they appear when properly locked about a bale. Fig. 3 represents a side view of the double locking or retaining hook, as will be hereinafter more fully described. Fig. 4 represents a bottom view of the parts shown in Fig. 3. Fig. 5 represents a section on line A B, Fig. 3, looking in the direction indicated by the arrow, same figure; and Fig. 6 represents a plan view of one end of the bale-tie and its oblong loop formed thereon, as will be hereinafter more fully described.

To enable those skilled in the art to which my invention belongs to make and use the same, I will proceed to describe it more in detail.

In the drawings, the parts marked C and D represent portions of the ends of a bale tie or wire. The end *a* of the part C is bent to form an oblong loop, E, and then twisted back upon itself to form twist *b*, while the end *c* of the part D is bent to form a loop, F, which encircles the lower part *d* of the neck of the double retaining-hook G, after which it is returned and twisted upon itself to form the twist *e*, which twist is run up so as to form a close and comparatively stiff and rigid connection between the end D and the double retaining-hook G, which is a very important feature in a practical point of view, as will be explained hereinafter.

The double hook G is formed with an upper part, H, and a lower part, I, united by a neck, which may be round or oval shape, but preferably of an oval shape, as indicated in the drawings. The upper part H projects on each side of the center of the neck, in a line running in the direction of the bale-tie, when placed about the bale, as indicated in Fig. 2 of the drawings, the end *f* of the part H extending a greater distance from the center of said neck than the end *g*. The part I is also made with two projecting ends, *h* and *i*, the end *h* projecting in the same direction and in the same or nearly same plane as the end *f* of the part H, and also projects farther from the center of the neck than the end *i*, for a purpose to be hereinafter described. In this instance the neck of the double retaining-hook is divided by a flange or collar, *j*, and by which friction and chafing of the loops E and F are prevented.

It will be seen that the parts H and I are oblong or elongated, and that they are rounded off on their extreme ends.

The double retaining-hook G may be made of malleable metal, or any other suitable material, in one piece.

The mode of operation of applying my improved bale-tie to bales is as follows: The bale having been suitably compressed, the bale-tie is passed around the bale, and the operator takes hold of the end D with one hand and the end C with the other, after which the oblong loop E is slipped over the point *f* of the hook part H and pushed forward until the outer end *k* of the oblong loop slips over the end *g* of the hook part H, and the parts, when the bale is removed from the press, assume the position represented in Fig. 2 of the drawings.

By the construction above described, the point *f* rests upon the base *m* of the oblong loop E. Consequently the hoop cannot draw down through the loop, nor is the loop liable to become detached from the hook, since its end *k* must be lifted up over the point *g* before it can be slipped from its position shown in Fig. 2.

In baling hay, particularly with what is known as the "perpetual press," there are more or less vibrations or pulsations of the ties after they have been put about the bale; and it will be seen that my improved tie is not liable to become disconnected by such or other pulsations or loosening of the bale-tie, since the end *f* will slide along on top of the twisted part *b*, thereby keeping the front end *k* of the oblong loop from rising and slipping up over the end *g*. Still again, the projecting end *h* of the lower part of the hook, bearing against the bale, aids very much in preventing the retaining-hook from being pulled over out of its proper relative position after the bale has been removed from the press.

As before stated, the end *c* is twisted to form the twist *e* until the loop F hugs the neck of the hook. Consequently, when the attendant takes hold of the end D of the bale-tie, the retaining-hook is held in the proper position to receive the oblong loop E as perfectly and as conveniently as if the hook formed a part or was made from the end of wire D.

Thus it will be seen that my improved bale-tie, after it has been once hooked or fastened about the bale, is not liable to become detached by any jolting or handling of the bale, as is often the case with other bale-ties. Furthermore, the connection is very easily made, requiring no turning of the tie or bending of the bale-wire in order to make said connection.

Having described my improvements in bale-ties, what I claim therein as new and of my invention, and desire to secure by Letters Patent, is—

1. In a bale-tie, the combination, with one end thereof, of a double hook or fastening device, held comparatively rigid in position by its neck being encircled and clasped by an eye or loop formed by twisting the end of the tie-wire back upon itself, and provided with a projecting or elongated end or point to rest upon the base of the oblong loop upon the other end of the bale-tie when the latter is locked or secured in position upon the bale, for the purposes stated.

2. The elongated parts H and I, provided with rounded ends *f*, *g*, *h*, and *i*, connected with a neck having a flange or collar, in combination with the loops E and F, substantially as shown and described.

CHARLES H. VICTORY.

Witnesses:
WM. F. ROCKEFELLER,
WM. H. LOW.